United States Patent
Fan et al.

(10) Patent No.: US 8,396,303 B2
(45) Date of Patent: Mar. 12, 2013

(54) METHOD, APPARATUS AND COMPUTER PROGRAM PRODUCT FOR PROVIDING PATTERN DETECTION WITH UNKNOWN NOISE LEVELS

(75) Inventors: Lixin Fan, Tampere (FI); Timo Pylvanainen, Tampere (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 1013 days.

(21) Appl. No.: 12/251,087

(22) Filed: Oct. 14, 2008

(65) Prior Publication Data

US 2010/0092026 A1 Apr. 15, 2010

(51) Int. Cl.
G06K 9/62 (2006.01)
G06K 9/74 (2006.01)
G06K 9/00 (2006.01)
G06K 9/46 (2006.01)
G06K 9/66 (2006.01)

(52) U.S. Cl. ........ 382/228; 382/100; 382/103; 382/190; 382/225

(58) Field of Classification Search .................. None
See application file for complete search history.

(56) References Cited

U.S. PATENT DOCUMENTS

| 3,069,654 A | 12/1962 | Hough |
| 5,430,810 A | 7/1995 | Saeki |
| 2008/0232707 A1 | 9/2008 | Lee et al. |

OTHER PUBLICATIONS

P. Kultanen, L. Xu, E. Oja; *Randomized Hough Transform*; ICPR; 1990.
M. Fischler, R.C. Bolles; *Random Sample Consensus : A Paradigm for Model Fitting with Applications to image Analysis and Automated Cartography*; 1981.
H. Chen, P. Meer; *Robust Computer Vision Through Kernel Density Estimation*; ECCV; 2002.
H. Wang, D.Suter; *Robust Adaptive-Scale Parametric Model Estimation for Computer Vision*; IEEE PAMI; 2004.
B.J. Tordoff, D.W. Murray; *Guided-MLESAC: Faster Image Transform Estimation by Using Matching Priors*; IEEE PAMI; 2005.
O. Chum, J. Matas; *Matching with PROSAC—Progressive Sample Consensus*; CVPR; 2005.
Lixin Fan et al., "Robust Scale Estimation from Ensemble Inlier Sets for Random Sample Consensus Methods," Computer Vision—ECCV 2008, Oct. 11, 2008, 14 pages.

*Primary Examiner* — Tom Y Lu
*Assistant Examiner* — Thomas Conway (57) ABSTRACT

An apparatus for providing pattern detection may include a processor. The processor may be configured to iteratively test different models and corresponding scales for each of the models. The models may be employed for modeling parameters corresponding to a visually detected data. The processor may be further configured to evaluate each of the models over a plurality of iterations based on a function evaluation of each of the models, select one of the models based on the function evaluation of the selected one of the models, and utilize the selected one of the models for fitting the data.

23 Claims, 6 Drawing Sheets

METHOD, APPARATUS AND COMPUTER PROGRAM PRODUCT FOR PROVIDING PATTERN DETECTION WITH UNKNOWN NOISE LEVELS

TECHNOLOGICAL FIELD

Embodiments of the present invention relate generally to pattern detection and, more particularly, relate to an apparatus, method and computer program product for enabling pattern detection with unknown noise levels.

BACKGROUND

Electronic computing devices are becoming increasingly ubiquitous in the modern world. Whether utilized for business, entertainment, communication, security or numerous other purposes, the capabilities of such devices continue to expand. Along with the improvements made in terms of processing power, rendering technology, memory, power consumption and other aspects, various applications have also been developed to utilize the expanded capabilities of computing devices. However, the expansion of capabilities with respect to such devices has also introduced new sets of challenges as further improvements are sought and new applications are developed.

One area in which the use of electronic computing devices has presented new challenges relates to computer vision. Computer vision utilizes machines to see. As such, for example, computer vision often employs cameras and other elements to build systems that can obtain information from image data such as a video sequence, views from multiple cameras or multidimensional data from scanning devices. Computer vision may be useful for many tasks such as: controlling processes or device movements; detecting and/or recognizing events, objects, patterns or people; organizing information; and/or the like. Accordingly, computer vision may be considered to be an artificial vision system, which may be implemented in combinations of various devices and applications.

One common situation encountered in computer vision relates to the fitting of noisy data with parametric models in the presence of high ratio noise. Existing technologies such as Hough transformations, RANSAC (random sample consensus), and improvements of these technologies are often utilized in such situations. However, Hough transformation and RANSAC based approaches are typically employed best in environments with known noise levels. In particular, both Hough transformation and RANSAC based approaches require the entry of a threshold or other user-specified control parameters, which may be difficult for users to estimate when noise levels are unknown. Accordingly, improvements in the area of pattern detection in environments with unknown noise levels may be desirable.

BRIEF SUMMARY OF EXEMPLARY EMBODIMENTS

A method, apparatus and computer program product are therefore provided that may enable devices to provide improved pattern detection in environments with unknown noise levels. In particular, some embodiments of the present invention may provide for model fitting without requiring user specified parameters. As such, for example, embodiments of the present invention may be enabled to simultaneously estimate parameters (e.g., a threshold), that would normally be provided by a user, and estimate a model, without any user-specified parameters. In this regard, embodiments of the present invention may enable an estimation of the scale of inlier noise to improve the accuracy of fitting results in the course of sampling and may also provide for use of ensemble inlier sets for guided sampling. Moreover, embodiments of the present invention may be more efficient than existing approaches.

In one exemplary embodiment, a method of providing pattern detection is provided. The method may include iteratively testing different models and corresponding scales for each of the models. The models may be employed for modeling parameters corresponding to a visually detected data. The method may further include evaluating each of the models over a plurality of iterations based on a function evaluation of each of the models, selecting one of the models based on the function evaluation of the selected one of the models, and utilizing the selected one of the models for fitting the data.

In another exemplary embodiment, a computer program product for providing pattern detection is provided. The computer program product may include at least one computer-readable storage medium having computer-executable program code portions stored therein. The computer-executable program code portions may include a first program code instructions, second program code instructions, third program code instructions and fourth program code instructions. The first program code instructions may be for iteratively testing different models and corresponding scales for each of the models. The models may be employed for modeling parameters corresponding to a visually detected data. The second program code instructions may be for evaluating each of the models over a plurality of iterations based on a function evaluation of each of the models. The third program code instructions may be for selecting one of the models based on the function evaluation of the selected one of the models. The fourth program code instructions may be for utilizing the selected one of the models for fitting the data.

In another exemplary embodiment, an apparatus for providing pattern detection is provided. The apparatus may include a processor that may be configured to iteratively test different models and corresponding scales for each of the models. The models may be employed for modeling parameters corresponding to a visually detected data. The processor may be further configured to evaluate each of the models over a plurality of iterations based on a function evaluation of each of the models, select one of the models based on the function evaluation of the selected one of the models, and utilize the selected one of the models for fitting the data.

In another exemplary embodiment, an apparatus for providing pattern recognition is provided. The apparatus may include means for iteratively testing different models and corresponding scales for each of the models. The models may be employed for modeling parameters corresponding to a visually detected data. The apparatus may further include means for evaluating each of the models over a plurality of iterations based on a function evaluation of each of the models, means for selecting one of the models based on the function evaluation of the selected one of the models, and means for utilizing the selected one of the models for fitting the data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Many computer vision problems essentially boil down to a problem of fitting noisy data with parametric models. This problem is often complicated by the presence of outliers (e.g., data points that do not satisfy a given model relation). The solution may be formulated as a MAP (maximum a posterior) estimation of a model parameter θ, given input data D and a user-specified threshold ε differentiating outliers from inliers as indicated in equation 1 below.

$$[\hat{\theta}] = \underset{\theta}{\operatorname{argmax}} \, p(\theta \mid D, \varepsilon). \tag{1}$$

For specific problems, it may be possible to evaluate a likelihood function L(θ|D, ε) (or simply L(θ) ) at certain discrete values of θ. From Bayesian theorem, the posterior distribution may be partially known up to a normalization constant:

$$p(\theta|D, \varepsilon) \propto L(\theta|D, \varepsilon) p(\theta). \tag{2}$$

If the priori distribution p(θ) is assumed uniform, it may be possible to seek maximum likelihood (ML) estimation using equation 3 below.

$$[\hat{\theta}] = \underset{\theta}{\operatorname{argmax}} \, L(\theta \mid D, \varepsilon). \tag{3}$$

For many computer vision problems, high outlier ratio data may render standard least squares fitting relatively useless. The likelihood function may account for the statistical nature of inliers and outlier models. Often, a set of indicator variables $\gamma=[\gamma_1 \ldots \gamma_N]$ may be assigned such that $\gamma_i=1$ if the ith corresponding data point is an inlier and $\gamma_i=0$ otherwise. In this regard, for example, a mixture model of Gaussian and uniform distributions may be used in the context of multiview geometry estimation $$L(\theta \mid D, \varepsilon) = \sum_{i=1}^{N} \left( \log\left( \gamma_i \frac{1}{\sqrt{2\pi\sigma^2}} \exp\left(-\frac{e_i^2}{2\sigma^2}\right) + (1-\gamma_i)\frac{1}{v} \right) \right) \tag{4}$$

where $e_i$ stands for the ith data point error, and v is the volume of the uniform distribution for outliers. While γ depends on (θ, D, ε), it may not be possible to express a specific formula for γ(θ, D, ε) and optimize equation (3) directly. Instead a RANSAC algorithm may be used to make an estimate of inlier sets.

However, RANSAC has a sensitivity to a user specified threshold and the scale of inlier noise. Accordingly, embodiments of the present invention may iteratively make estimates of scale for various proposed models. As an example, embodiments of the present invention may provides a mechanism by which, according to equation (5) below, $$[\hat{\theta}, \hat{\varepsilon}] = \underset{\theta, \varepsilon}{\operatorname{argmax}} \, L(\theta, \varepsilon \mid D). \tag{5}$$

various models and a corresponding scale for each may be iteratively tested over a plurality of iterations. In equation (5), L may be considered to correspond to an objective evaluation of a given model, such that the higher the value of L, the better the model. Thus, the function evaluation may provide an indication of how well ε and θ fit the data D.

Some embodiments of the present invention may enable the simultaneous determination of both scale estimation and a best model including model parameters for fitting data in a noisy environment. The scale estimation may provide a scale of inlier data points among a plurality of noisy data points. As such, outlier data points may be disregarded and a smaller set of points may be considered for improving sampling efficiency for a fitting problem. Accordingly, embodiments of the present invention may provide a robust method for estimating a scale of inlier noise in the course of random sampling and may provide for an ensemble inlier set for guided sampling. The scales may be derived from statistics of repeated inlier data points accumulated from various different proposed models. The use of accumulated inlier data points, which may be defined as the ensemble inlier set, may provide a relatively simple and efficient computational tool to classify inliers and outliers within a data set. The probabilistic inlier/outlier classification may then be used to attenuate effects of extreme outliers by providing a resultant scale estimator (e.g., weighted median absolute deviation (WMAD)), which may improve fitting result accuracy. The guided sampling approach does not require any auxiliary information, such as match scores, to be provided, and therefore lends itself well to being used in different fitting problems.

As discussed above, embodiments of the present invention may be practiced in the context of a computer vision system. As such, an exemplary embodiment will now be described in reference to FIG. 1, which illustrates a basic block diagram of a system for employing a computer vision system. However, it should be appreciated that embodiments of the present invention could be practiced in numerous other pattern detection environments and are not limited to application in connection with computer vision systems. Moreover, even in connection with computer vision systems, it should be recognized that FIG. 1 is merely one basic example of such a system and should not be seen as limiting in any way.

Figure 1:
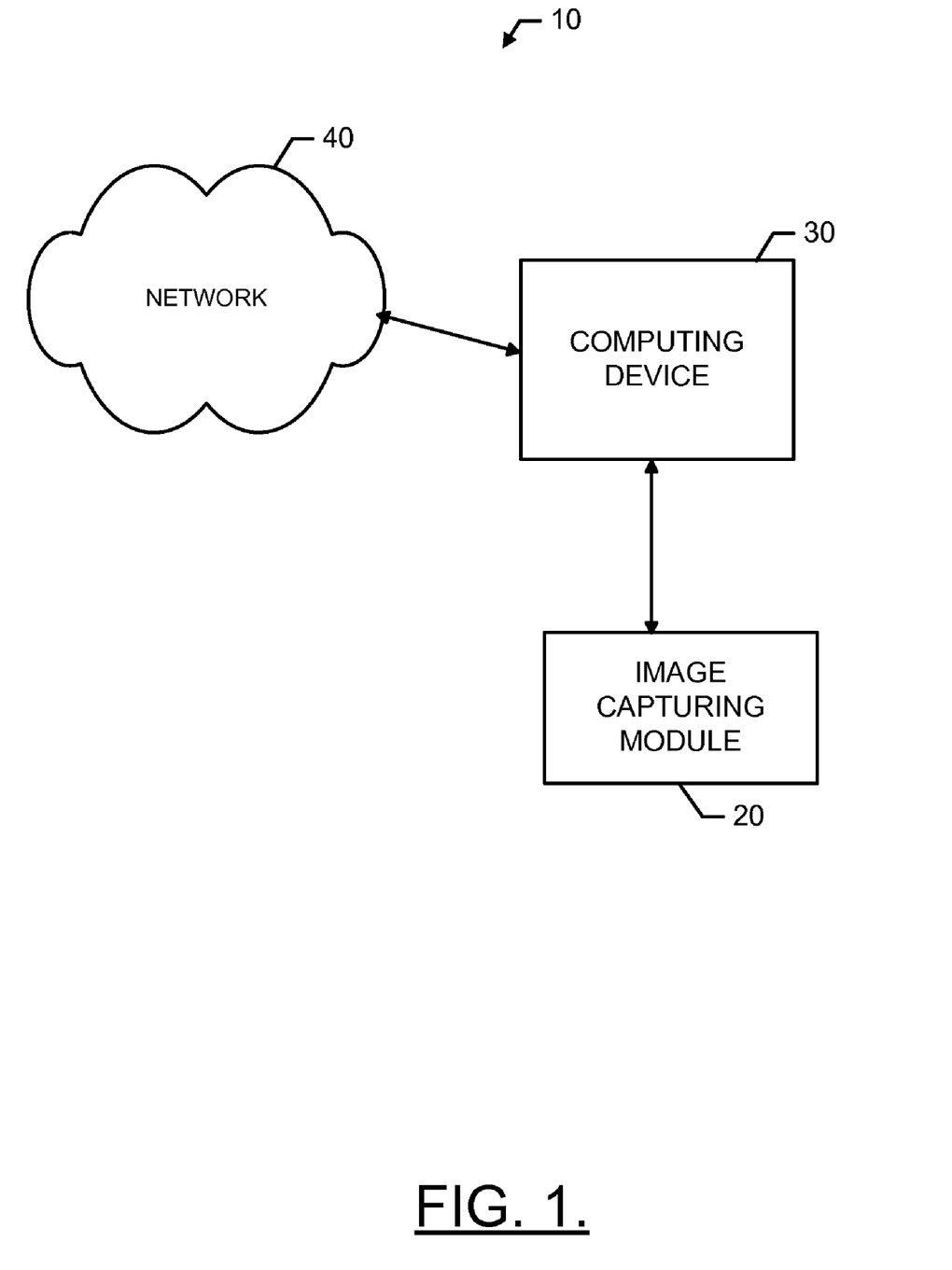
FIG. 1 is a schematic block diagram of a computer vision system according to an exemplary embodiment of the present invention.

Referring now to FIG. 1, a computer vision system 10 may include an image capturing module 20 and a computing device 30. The image capturing module 20 may include one or more cameras or other image capturing sensors configured to capture image data. The image data may be in the form of, for example, a video sequence or one or more images from one or more respective cameras or sensors. The computing device 30 may be a computer (e.g., a personal computer, laptop, server, or the like), a mobile telephone, global positioning system (GPS) device, a personal digital assistant (PDA), pager, mobile television, gaming device, camera, audio/video player, radio, or any combination of the aforementioned, and other types of electronic devices that may include a processor and/or memory for executing various hardware and/or software processes. The computing device 30 may be configured to employ processing in accordance with embodiments of the present invention as described in greater detail below in connection with the description of FIG. 2.

Communication between the image capturing module 20 and the computing device 30 may be real-time or near real-time via either wired or wireless transmission mechanisms. In some cases, the communication between the image capturing module 20 and the computing device 30 may be intermittent or delayed. Furthermore, in some situations, the image capturing module 20 may store image data, which may then be communicated to the computing device 30 at a later time (directly or via an intermediate device). However, in some embodiments, the image capturing module 20 and the computing device 30 may be portions of a single device (e.g., a mobile terminal or phone with a built in camera). In some cases, the computing device 30 may be in communication with other devices via a network 40, although no network connection is required.

Figure 2:
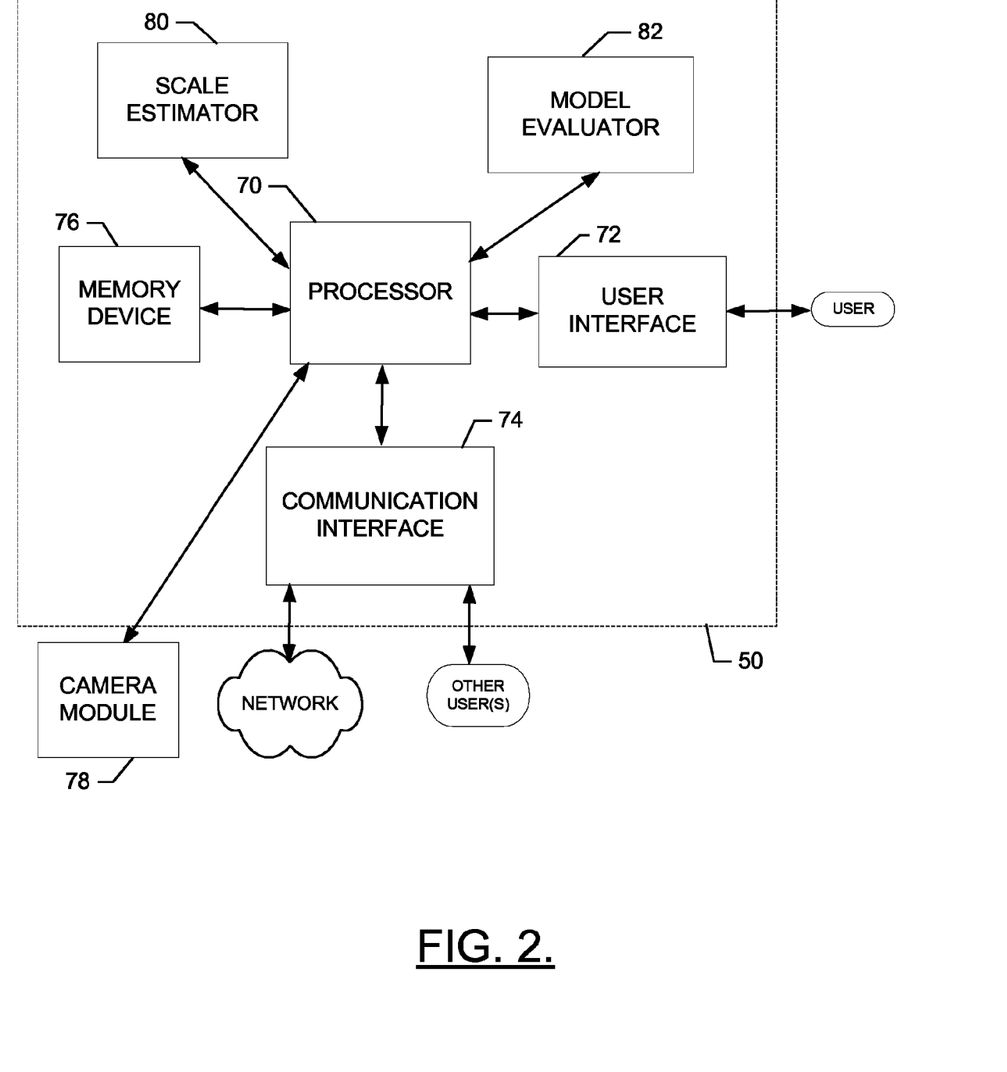
FIG. 2 is a schematic block diagram of an apparatus for providing pattern recognition according to an exemplary embodiment of the present invention.

Referring now to FIG. 2, a schematic block diagram of an apparatus 50 for providing pattern recognition according to an exemplary embodiment of the present invention is provided. The apparatus 50 may include or otherwise be in communication with a processor 70, a user interface 72, a communication interface 74 and a memory device 76. However, the apparatus 50 may further include additional elements as described in greater detail below. In this regard, it should be understood that the exemplary embodiment of FIG. 2 is provided merely for exemplary purposes and thus other configurations for the apparatus 50 are also possible. Moreover, certain elements shown in FIG. 2 may be split between multiple devices (e.g., operating in a client/server relationship) or may all be embodied at the same device.

The memory device 76 may include, for example, volatile and/or non-volatile memory. Volatile memory 40 may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory, non-volatile memory may include a cache area for temporary storage of data. The memory device 76 may store any of a number of pieces of information, and data, used by the apparatus 50 to implement the functions of the apparatus 50. The memory device 76 may be configured to store information, data, applications, instructions or the like for enabling the apparatus to carry out various functions in accordance with exemplary embodiments of the present invention. For example, the memory device 76 may be configured to buffer input data for processing by the processor 70. Additionally or alternatively, the memory device 76 may be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an exemplary embodiment, the processor 70 may be configured to execute instructions stored in the memory device 76 or otherwise accessible to the processor 70. Additionally or alternatively, the processor 70 may be configured to direct or control the operation of other modules or functional elements to effect operations in accordance with embodiments of the present invention.

The communication interface 74 may be embodied as any device or means embodied in either hardware, software, or a combination of hardware and software that is configured to receive and/or transmit data from/to a network and/or any other device or module in communication with the apparatus 50. In this regard, the communication interface 74 may include, for example, an antenna and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a touch screen, a display, a microphone, a speaker, or other input/output mechanisms. In an exemplary embodiment in which the apparatus is embodied as a server, the user interface 72 may be limited, or eliminated.

In some embodiments, the apparatus 50 may include or be in communication with a media capturing module (e.g., the image capturing module 20), such as a camera, video and/or audio module, in communication with the controller 20. The media capturing module may be any means for capturing an image, video and/or audio for storage, display or transmission. For example, in an exemplary embodiment in which the media capturing module is a camera module 78, the camera module 78 may include a digital camera capable of forming a digital image file from a captured image or forming a video content file from a sequence of image frames. As such, the camera module 78 may include all hardware, such as a lens or other optical device, and software necessary for creating a digital image file from a captured image. Alternatively, the camera module 78 may include only the hardware needed to view an image, while a memory device of the apparatus 50 stores instructions for execution by the controller 20 in the form of software necessary to create a digital image file from a captured image. In an exemplary embodiment, the camera module 78 may further include a processing element such as a co-processor which assists the processor 70 in processing image data and an encoder and/or decoder for compressing and/or decompressing image data. The encoder and/or decoder may encode and/or decode according to a JPEG standard format or other formats.

In an exemplary embodiment, the processor 70 may be embodied as, include or otherwise control a scale estimator 80 and a model evaluator 82. The scale estimator 80 and the model evaluator 82 may each be any means such as a device or circuitry embodied in hardware, software or a combination of hardware and software that is configured to perform the corresponding functions of the scale estimator 80 and the model evaluator 82 as described below.

Figure 3:
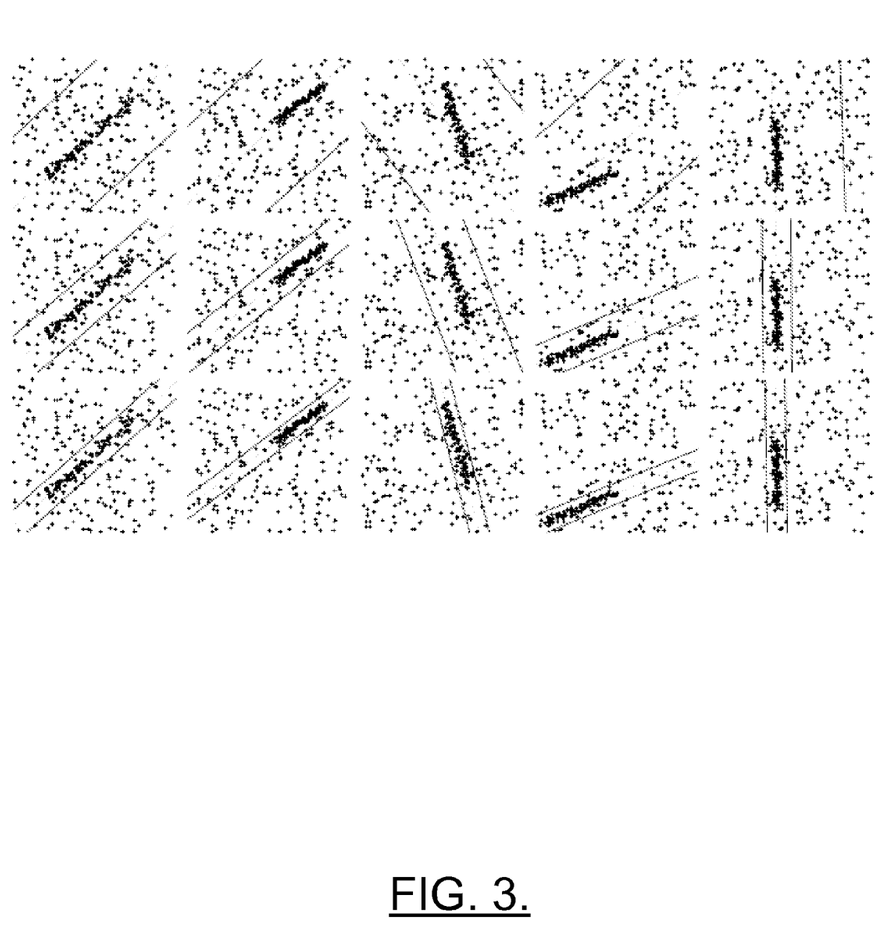
FIG. 3 is an illustration of different algorithms employed for fitting data for providing pattern recognition according to an exemplary embodiment of the present invention.
Figure 4:
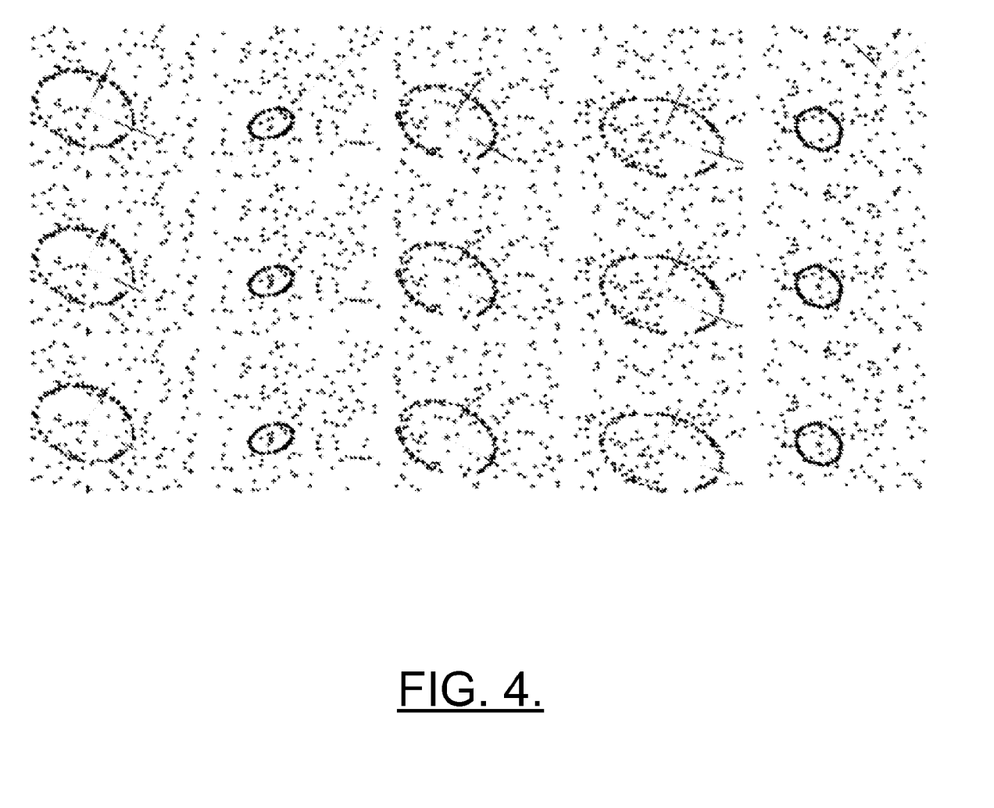
FIG. 4 is an illustration of different algorithms employed for fitting alternative data for providing pattern recognition according to an exemplary embodiment of the present invention.
Figure 5A:
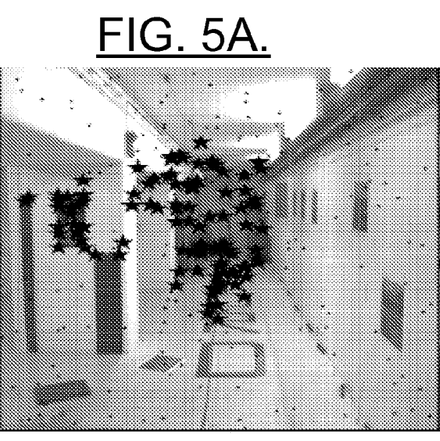
FIG. 5 shows an example of fundamental matrix estimation in accordance with an exemplary embodiment of the present invention.
Figure 5B:
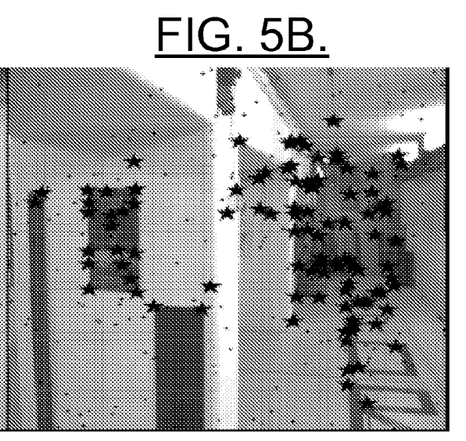
Figure 5C:
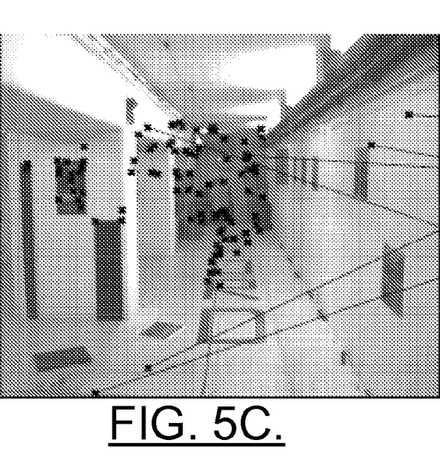
Figure 5D:
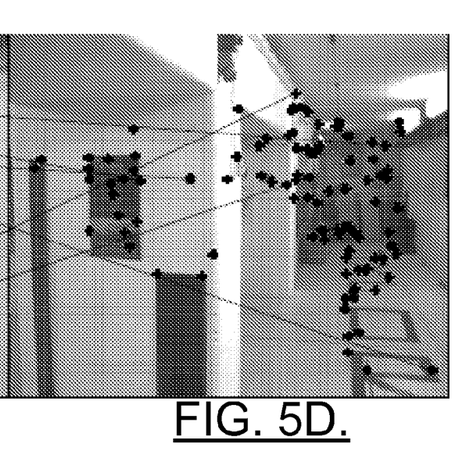

The scale estimator 80 may be configured to estimate scale using statistics of repeated inlier data points accumulated over a plurality of proposed models. The model evaluator 82 may be configured to evaluate models based on various criteria and enable the selection of a particular model for fitting operations as described herein. Equation (5) above tends to favor models with a larger number of inlier data points. Thus, the function evaluation may provide low weights for relatively bad models and high weights for relatively good models to result in a high score for models that give a larger number of inlier points. By estimating scale, the scale estimator 80 effectively separates inliers from outliers. For example, as shown in FIG. 3, which illustrates a two dimensional line segment fitting example with 100 inliers and 200 outliers in which the dotted line estimates the line model and each solid line identifies the estimated scale, the inliers lay between the solid lines. It should also be noted that the five different datasets shown in FIG. 3 have each been fit by three different methods to show various examples. In this regard, the top fitting in each dataset is performed using RANSAC with median absolute deviations (MAD), the middle fitting in each dataset is performed using RANSAC with ensemble inlier sets (EIS) according to an exemplary embodiment, and the bottom fitting in each dataset is performed using RANSAC with ensemble inlier sets with a Metropolis-Hasting (MH) step. FIG. 4 shows similar results for ellipse fitting in an example with 100 inliers and 160 outliers. As can be seen from FIGS. 3 and 4, the scale (represented by the distance between the solid lines in FIG. 3 and by the length of the solid lines in FIG. 4) for fittings using ensemble inlier sets is reduced by each subsequent embodiment employing EIS so that more outliers can be excluded from consideration to give a better fit.

In an exemplary embodiment, scale estimation may proceed according to the description provided below. In this regard, a model may be defined as a parameterized function $f(x|\theta)$, where x is a data point and $\theta$ is an unknown model parameter. It may be desirable to find models in a set of N points $x_n \in D$, $n \in 1, 2, \ldots N$. A point may fit the model when $f(x_n|\theta)=0$. For a set of s points, there may exist a unique model $\theta$ for which all s points fit perfectly. Such a set may be referred to as a minimal subset and s may be referred to as model dimensionality. As an example, in line fitting, two points may constitute a minimal subset (e.g., s=2), while in ellipse fitting, s may equal 5. A permissible model of D may be one defined by a minimal subset and all permissible models may form a finite discrete model set $\Theta$.

Given a scale parameter $\epsilon$, the inlier set for model $\theta$ may be given by equation (6) below $$I_\epsilon(\theta) = \{x \in D | |f(x|\theta)| \leq \epsilon\}, \quad (6)$$

in which $f(x|\theta)$ is the error of fitting x with $\theta$, and $|.|$ is the absolute value of the error. The setting of $\epsilon$ may be related to the scale of inlier noise. The inlier set may be referred to as the perfect set $I_0(\theta)$ of model $\theta$ when $\epsilon=0$. For a standard RANSAC approach, the likelihood L is simply taken as the cardinality of inlier sets. More robust results may be obtained by taking into account how well inlier points fit the estimated model as in equation (4).

If the scale $\epsilon$ is unknown and can be chosen freely, the number of inliers may take a maximum as $\hat{\epsilon} \to \infty$. One possible solution to this problem is to use the $$L(\theta, \epsilon | D) = \frac{|I_\epsilon(\theta)|}{\epsilon}. \quad (7)$$

likelihood function

Unfortunately, this likelihood function may bring about another degenerate solution $\hat{\epsilon} \to 0$ when any one of minimal sets is selected. As a robust solution to avoid these degenerate cases, it may be possible to estimate the median absolute deviation (MAD) of fitting error $$\hat{\epsilon}_{MAD} = \text{median}(|f(x_n|\theta) - \text{median}(f(x_n|\theta))|); x_n \in D \quad (8)$$

and use its inverse as the $$L(\theta | D) = \frac{1}{\hat{\epsilon}_{MAD}}. \quad (9)$$

Notice that $\hat{\epsilon}_{MAD}$ is not a free parameter but a maximum likelihood estimation given D and $\theta$. As such, MAD may be a relatively robust scale estimator with a breakdown point of 0.5 and bounded influence function. MAD may often be used as ancillary scale estimation for iterative M-estimators. If inlier set distribution is assumed to be Gaussian, the standard deviation may be estimated as:

$$\hat{\sigma} = \frac{\hat{\epsilon}_{MAD}}{\Phi^{-1}\left(\frac{3}{4}\right)} = 1.4826 * \hat{\epsilon}_{MAD}. \quad (10)$$

In many computer vision applications, however, MAD may tend to over-estimate when the outlier ratio is high (e.g., >0.5). As a modification to MAD, Weighted Median Absolute Deviation (WMAD) can be used to attenuate effects of extreme outliers:

$$\hat{\epsilon}_{WMAD} = WM(|f(x_n|\theta) - WM(f(x_n|\theta), w_n)|, w_n); x_n \in D \quad (11)$$

in which $w_n$, $n \in [1 \ldots N]$ is a non-negative scalar, proportional to the probability of each data point being an inlier. Weighted Median (WM) filter is an extension of median filter in that it duplicates each sample $w_n$ times before taking median of input samples. Like $\hat{\epsilon}_{MAD}$, the scale estimator in equation (11) may not be a free parameter, but a quantity uniquely determined by D, θ and weights W=[$w_1 w_2 \ldots w_n$]. Accordingly, it may be useful to have a mechanism for determining how to assign weights $w_n$ to each data point for robust estimation of scales.

It follows from equation (6) that for any given data set D and scale ϵ, there exists a mapping from a model parameter $θ_i$ to its inlier set $I_ϵ(θ_i)$. The inlier set may be represented by an indication vector $γ(θ_i) = [γ_1 \ldots γ_N]$ with each component:

$$\gamma_n = \begin{cases} 1 & \text{if } x_n \in I_\varepsilon(\theta_i), \\ 0 & \text{otherwise.} \end{cases} \quad n \in 1, 2, \ldots N. \quad (12)$$

When many new models are proposed, corresponding inlier sets may be accumulated by summing up $γ(θ_i)$. We end up with a weight vector W=[$w_1 \ldots w_N$] associated with all data points:

$$W = \sum_{i=1}^{T} \gamma(\theta_i). \quad (13)$$

The weight for each data point may count how many times the data point has been selected as an inlier by all T models. Notice that accumulated inlier sets are not union of inlier sets, since repeated inlier data points are counted multiple times. To this end, the term ensemble inlier sets (EIS) may be used to describe the accumulated inlier sets.

Given a scale threshold ϵ, the set of associate models for data point x may be defined as a collection of permissible models that accept x as an inlier, e.g., $$A_\epsilon(x) = \{\theta \in \Theta | |f(x|\theta)| \leq \epsilon\}. \quad (14)$$

For all inliers $x_k$ in set $I_ϵ(θ^*)$, corresponding associate models intersect and the intersection may contain θ*:

$$\theta^* \in \bigcap_{x_k \in I_\varepsilon(\theta^*)} A_\varepsilon(x_k). \quad (15)$$

If θ* is an optimal model (e.g., a model to be selected for use) and an appropriate ϵ is given, associate models for inliers $A_\epsilon(x_k)$ may include many suboptimal models in the vicinity of θ*. In contrast, associate models of outliers may include fewer permissible models. As such, the relative number of associate models (e.g., the count of how many times data points in question are selected as inliers by all permissible models) may be used to identify inliers of the optimal model. Classification in this manner may be relatively insensitive to different scales. While it may be practically impossible to enumerate all associate models for high dimensional problems, EIS W may be used instead, as an estimate of the number of associate models. As such, for example, the once scale has been determined by the scale estimator 80 for various models, the model evaluator 82 may be configured to evaluate and score the models to determine a model for use in fitting.

Throughout random sampling iterations, each sampling model $θ_i$, together with W, may give rise to an estimation of scale $\hat{\epsilon}_i$ according to equation (11). Since the likelihood function may be defined as the inverse of $\hat{\epsilon}$, the maximum likelihood scale may be taken as the minima of all estimated scales:

$$\hat{\epsilon} = \min(\hat{\epsilon}_i) \quad (16)$$

The estimated $\hat{\epsilon}$ may then be used to update W according to equations (12) and (13) in the next iteration. The whole estimation process may start from an initial $\hat{\epsilon}_0$ (e.g. =∞ or $\hat{\epsilon}_{MAD}$) and iterates between updating W and refining $\hat{\epsilon}$ separately. Due to equation (16), $\hat{\epsilon}$ decreases monotonically. In some embodiments, under two boundary conditions, e.g., ϵ→∞ and ϵ=0, the number of associate models may be constant for any data points, and W may converge to a uniform weighting after many iterations. Therefore, these two boundary conditions ensure that $\hat{\epsilon}$ converges to some positive fixed point $\epsilon^* \in (0, +\infty)$ Examples of three algorithms described herein are provided below.

---

Algorithm 1 RANSAC-MAD

1. Initialize $\epsilon_o = \infty$.
2. Randomly draw s data points and compute the model $θ_i$ defined by these points.
3. Evaluate the model and estimate $\hat{\epsilon}_i$ according to (8).
4. If $\hat{\epsilon}_i < \hat{\epsilon}$, set $\hat{\theta} = \theta_i$ and $\hat{\epsilon} = \hat{\epsilon}_i$.
5. Repeat 2-4 until #MaxIter has been reached.

---

Algorithm 2 RANSAC-EIS

1. Initialize $\epsilon_o = \infty$, $w_n = 1$ in W = [$w_1 w_2 \ldots w_n$] for all points $x_n$.
2. Randomly draw s data points and compute the model $θ_i$.
3. Evaluate the model and update W according to (12) and (13).
4. Estimate $\hat{\epsilon}_i$ according to (11) by using weights W.
5. If $\hat{\epsilon}_i < \hat{\epsilon}$, set $\hat{\theta} = \theta_i$ and $\hat{\epsilon} = \hat{\epsilon}_i$.
6. Repeat 2-5 until #MaxIter has been reached.

---

Algorithm 3
RANSAC-EIS-Metropolis

1. Initialize $\epsilon_0 = \infty$, assign $w_n = 1$ in W = [$w_1 w_2 \ldots w_n$] and $w_n' = 1$ in $W_{samp} = [w_1' w_2' \ldots w_n']$ for all point $x_n$.
2. Randomly draw s data points with probability proportional to $w_n'$, and compute the model $θ_i$.
3. Evaluate the model and update W according to (12) and (13).
4. Estimate $\hat{\epsilon}_i$ according to (11) by using weights W.
5. If $\hat{\epsilon}_i < \hat{\epsilon}$, set $\hat{\theta} = \theta_i$ and $\hat{\epsilon} = \hat{\epsilon}_i$.
6. If t = 1, set $\theta_{s_1} = \theta_i$ and update $W_{samp}$. Otherwise, calculate the ratio using (8):

$$\alpha = \frac{L_{MAD}(\theta_i)}{L_{MAD}(\theta_{s_{t-1}})}. \quad (17)$$

7. Draw uniformly distributed random number U ∈ [0 1]. Set $\theta_{s_t} = \theta_i$ and update $W_{samp}$ if U ≤ min(α, 1), otherwise set $\theta_{s_t} = \theta_{s_{t-1}}$ and keep $W_{samp}$ unchanged.
8. Repeat 2-7 until #MaxIter has been reached.

---

In standard RANSAC sampling, proposed models are uniformly distributed over all permissible models:

$$q(\theta_i) = \frac{1}{C}; \theta_i \in \Theta \quad (18)$$

in which C(≈$N^8$) is the total number of all permissible models. A potential drawback may arise in relation to equation (18) in that even if a suboptimal model has been proposed and deemed as a good model, the probability of hitting the nearby optimal model is still unchanged. A hill climbing algorithm may be used to explore the neighborhood of the best model. For example, ensemble inlier sets W may be used to achieve efficient sampling.

If s data points are randomly drawn with probability proportional to corresponding weights $\omega_n$, the probability of sampling a new model $\theta$ may be given by $$q(\theta) \propto \prod_{\{n | x_k \in I_0(\theta)\}} w_n \qquad (19)$$

in which $I_o(\theta)$ is a perfect inlier set of $\theta$.

From equations (12) and (13), it may be determined that W has high weights for potentially true inlier points and low weights for outliers. Therefore, this non-uniform sampling distribution revisits high likelihood models more often, while it pays less attention to those models with low likelihood scores.

However, remember that W includes accumulated inlier sets of all proposed models. If some models are favored by the current W, they will be more likely selected and accumulated again in the updated W. This may lead to a biased histogram with one or a few models peaked while other models are suppressed. In some embodiments, (e.g., see algorithm 3 above), a Metropolis step may be incorporated to provide for reaching a globally optimal model in a finite number of iterations.

In an exemplary embodiment, the score function $L(\cdot|D)$ in (17) may be is set as the inverse of $\hat{\epsilon}_{MAD}$ in equation (8) instead of $\hat{\epsilon}_{WMAD}$ in equation (11). This Metropolis step may provide that the distribution of models that are used to update $W_{samp}$ is independent of $W_{samp}$. With this adaptive sampling step, sampling efficiency may be improved, while the accumulated histogram faithfully respects the input dataset.

In an exemplary embodiment, for line fitting, multiple (e.g., 2) points may be randomly drawn from a dataset, and recovered models may be evaluated during each iteration (e.g., by the model evaluator 82). For an exemplary ellipse fitting, multiple (e.g., 5) points may be drawn and an algorithm may be used to recover model parameters (e.g., by the model evaluator 82). Ground truth line segments and ellipses may be randomly generated on a 2D region with x,y coordinates between a set range of values. Each model may include a specified number of points and have a random size between a set range of values. Gaussian noise with standard deviation of a particular value may be added to the x,y coordinates of each inlier point.

Accordingly, based on the above descriptions, embodiments of the present invention may be utilized for iteratively testing different models and corresponding scales for each of the models, in which the models being employed for modeling parameters correspond to visually detected data. The models may then be evaluated over several iterations in order to enable selection of a model (e.g., a best model) for use in fitting data having various dimensional characteristics. In the context of embodiments of the present invention, the term visually detected data should be understood to include both two dimensional data and also high dimensional manifold. As such, embodiments of the present invention may be used for both identifying two dimensional objects (e.g., lines, ellipses, etc.) and/or performing transformations between two sets of points. Thus, embodiments of the present invention may be employed to perform high dimensional fundamental matrix estimation for 3D reconstruction. For fundamental matrix estimation, multiple (e.g., two) frames with a wide baseline from a corridor sequence may be used in connection with algorithms employed for the performance of embodiments of the present invention (e.g., algorithms 1 to 3). The ground truth for such sequence may be known and there may be inlier matches determined between frames. Points may be randomly drawn from a dataset, and an algorithm may be used to estimate a fundamental matrix for each iteration. As such, fundamental matrix estimation may be performed by embodiments of the present invention for various applications including, for example, an application of 3D point cloud reconstruction from a collection of photos.

FIG. 5 shows an example of fundamental matrix estimation in accordance with an exemplary embodiment of the present invention. In this regard, FIG. 5, which includes FIGS. 5A through 5D, shows a corridor sequence in which there are 104 inlier matches between frames. Eight points were randomly drawn from a dataset and a standard eight point algorithm is used to estimate F for each iteration. Gaussian noise with a standard deviation of 1.0 is added to the 2D coordinates of inlier points. 150 uniformly distributed outlier points are added to each frame. All algorithms repeat 10 times with 5 different threshold values. Embodiments employing EIS showed closer to a 1:1 ratio in inliers to the number of true inliers. FIGS. 5A and 5B show 104 true inliers (stars) and 150 outliers (dots) uniformly distributed over images. FIGS. 5C and 5D show a RANSAC-EIS-Metropolis fitting result with 100 inliers, in which 94 are true inliers and 6 mismatch. 144 outliers and 10 true inliers are rejected.

Embodiments of the present invention may address at least two important aspects of RANSAC type of methods. In this regard, automatic scale estimation may be achieved by using accumulated inlier points from previous RANSAC iterations. Compared with other scale estimation methods, which often rely on mean-shift algorithms, embodiments of the present invention may provide a self-contained solution and may not require the provision of additional parameters. Furthermore, the combination of Ensemble Inlier Sets and Weighted Median Absolute Deviation may provide a robust scale estimation approach without requiring substantial modification from standard RANSAC algorithm approaches. Additionally, RANSAC sampling efficiency can be significantly boosted by using EIS-based sampling. Since no auxiliary information beyond the given data is required, embodiments of the present invention may be readily applied to different fitting problems as demonstrated herein. Moreover, Ensemble Inlier Sets may provide a robust and efficient computational tool suitable for any methods with random sampling nature.

Figure 6:
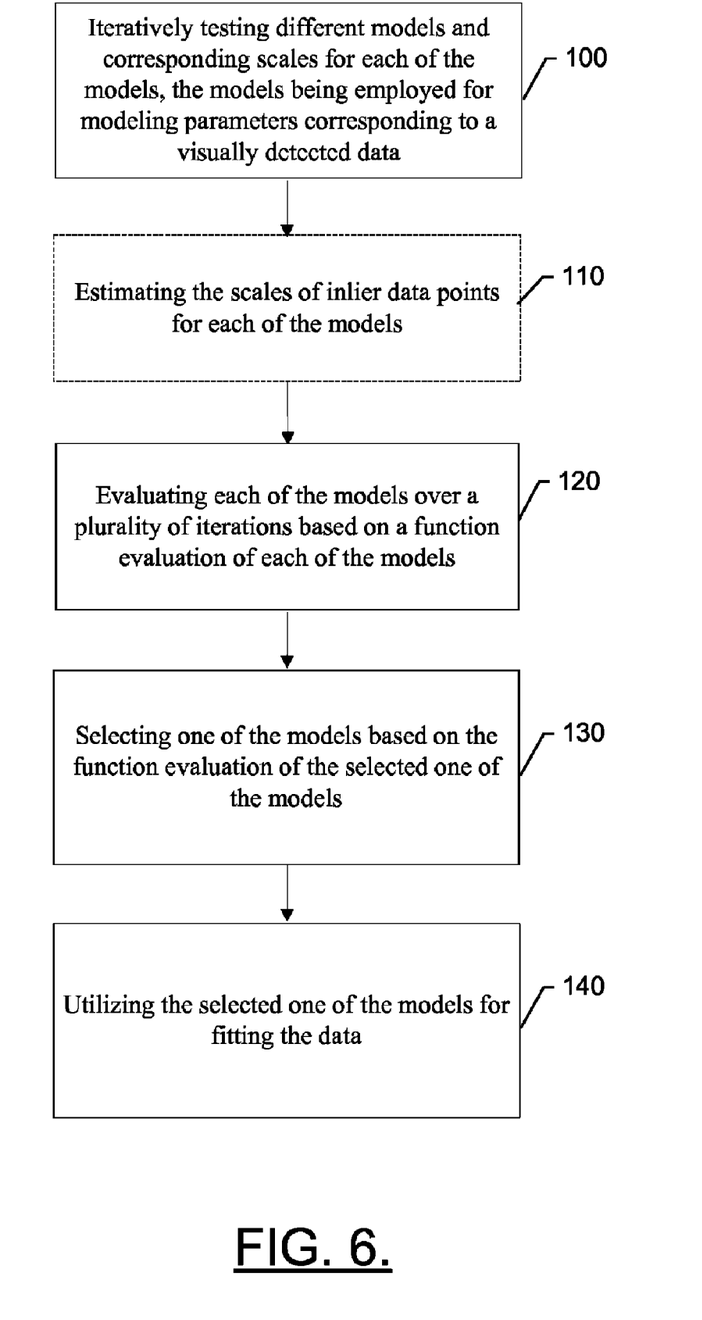
FIG. 6 is a flowchart according to an alternative exemplary method of providing pattern recognition according to an exemplary embodiment of the present invention.

FIG. 6 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor (e.g., the processor 70). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing pattern recognition as provided in FIG. 6 may include iteratively testing different models and corresponding scales for each of the models at operation 100. The models may be employed for modeling parameters corresponding to a visually detected data. The method may further include evaluating each of the models over a plurality of iterations based on a function evaluation of each of the models at operation 120, selecting one of the models based on the function evaluation of the selected one of the models at operation 130, and utilizing the selected one of the models for fitting the data at operation 140.

In some embodiments, the method may include further optional operations, an example of which is shown in dashed lines in FIG. 6. In this regard, the method may further include estimating the scales of inlier data points for each of the models at operation 110. In an exemplary embodiment, operation 110 may include deriving the scales based on repeated inlier data points accumulated from the different models.

In certain embodiments, certain ones of the operations above may be modified or further amplified as described below. It should be appreciated that each of the modifications or amplifications below may be included with the operations above either alone or in combination with any others among the features described hereafter. In this regard, for example, utilizing the selected one of the models may include utilizing the selected one of the models without any user input beyond provision of the data. Evaluating each of the models may include assigning a weighting factor to each respective model on the basis of how well each respective model fits the data and assigning a score to the model based on the weighting factor. Assigning the weighting factor may include summing values assigned to each data point for each of the models, the assigned values being indicative of an inlier status of each point for each respective model. In some cases, selecting one of the models may include selecting a model based on the score of the model without any provision of auxiliary information by a user. In an exemplary embodiment, iteratively testing different models and corresponding scales may include simultaneously estimating a model parameter and a scale defining inlier data without auxiliary information beyond the data.

In an exemplary embodiment, an apparatus for performing the method above may include a processor (e.g., the processor 70) configured to perform each of the operations (100-140) described above. In some cases, the processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 100 to 110 may include, for example, the scale estimator 80 and/or the processor 70 and examples of means for performing operations 120-140 may include, for example, the model evaluator 82 and/or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   iteratively testing, at a processor, different models and corresponding scales for each of the models, the models being employed for modeling parameters corresponding to a visually detected data, captured by an image capturing module;
   evaluating, by a module evaluator, each of the models over a plurality of iterations based on a function evaluation of each of the models;
   selecting, at the processor, one of the models based on the function evaluation of the selected one of the models; and
   utilizing, at the processor, the selected one of the models for fitting the data,
   wherein evaluating each of the models comprises assigning a weighting factor to each respective model on the basis of how well each respective model fits the data and assigning a score to the model based on the weighting factor, the weighting factor comprising a weight for each data point indicating how many times the data point has been selected as an inlier for all models.

2. The method of claim 1, wherein utilizing the selected one of the models comprises utilizing the selected one of the models without any user input beyond provision of the data.

3. The method of claim 1, wherein selecting one of the models comprises selecting a model based on the score of the model without any provision of auxiliary information by a user.

4. The method of claim 1, wherein assigning a weighting factor comprises summing values assigned to each data point for each of the models, the assigned values being indicative of an inlier status of each point for each respective model.

5. The method of claim 1, wherein iteratively testing different models and corresponding scales comprises concurrently estimating a model parameter and a scale defining inlier data without auxiliary information beyond the data.

6. The method of claim 1, further comprising estimating, by a scale estimator, the scales of inlier data points for each of the models.

7. The method of claim 6, wherein estimating the scales comprises deriving the scales based on repeated inlier data points accumulated from the different models.

8. A computer program product comprising at least one non-transitory computer-readable storage medium having computer-executable program code portions stored therein, the computer-executable program code instructions comprising:
first program code instructions for iteratively testing different models and corresponding scales for each of the models, the models being employed for modeling parameters corresponding to a visually detected data;
second program code instructions for evaluating each of the models over a plurality of iterations based on a function evaluation of each of the models;
third program code instructions for selecting one of the models based on the function evaluation of the selected one of the models; and
fourth program code instructions for utilizing the selected one of the models for fitting the data,
wherein evaluating each of the models comprises assigning a weighting factor to each respective model on the basis of how well each respective model fits the data and assigning a score to the model based on the weighting factor, the weighting factor comprising a weight for each data point indicating how many times the data point has been selected as an inlier for all models.

9. The computer program product of claim 8, wherein the fourth program code instructions include instructions for utilizing the selected one of the models without any user input beyond provision of the data.

10. The computer program product of claim 8, wherein the third program code instructions include instructions for selecting a model based on the score of the model without any provision of auxiliary information by a user.

11. The computer program product of claim 8, wherein the fourth program code instructions include instructions for summing values assigned to each data point for each of the models, the assigned values being indicative of an inlier status of each point for each respective model.

12. The computer program product of claim 8, wherein the first program code instructions include instructions for simultaneously estimating a model parameter and a scale defining inlier data without auxiliary information beyond the data.

13. The computer program product of claim 8, further comprising fifth program code instructions for estimating the scales of inlier data points for each of the models.

14. The computer program product of claim 13, wherein the fifth program code instructions include instructions for deriving the scales based on repeated inlier data points accumulated from the different models.

15. An apparatus comprising:
a model evaluator configured to evaluate models based on various criteria; and
a processor configured to:
iteratively test different models and corresponding scales for each of the models, the models being employed for modeling parameters corresponding to a visually detected data;
control the model evaluator to evaluate each of the models over a plurality of iterations based on a function evaluation of each of the models;
select one of the models based on the function evaluation of the selected one of the models; and
utilize the selected one of the models for fitting the data,
wherein evaluating each of the models comprises assigning a weighting factor to each respective model on the basis of how well each respective model fits the data and assigning a score to the model based on the weighting factor, the weighting factor comprising a weight for each data point indicating how many times the data point has been selected as an inlier for all models.

16. The apparatus of claim 15, wherein the processor is further configured to utilize the selected one of the models by utilizing the selected one of the models without any user input beyond provision of the data.

17. The apparatus of claim 15, wherein the processor is further configured to select one of the models by selecting a model based on the score of the model without any provision of auxiliary information by a user.

18. The apparatus of claim 15, wherein the processor is further configured to assign a weighting factor by summing values assigned to each data point for each of the models, the assigned values being indicative of an inlier status of each point for each respective model.

19. The apparatus of claim 15, wherein the processor is further configured to iteratively test different models and corresponding scales by simultaneously estimating a model parameter and a scale defining inlier data without auxiliary information beyond the data.

20. The apparatus of claim 15, further comprising a scale estimator, wherein the processor is further configured to control the scale estimator to estimate the scales of inlier data points for each of the models.

21. The apparatus of claim 20, wherein the processor is further configured to control the scale estimator to estimate the scales by deriving the scales based on repeated inlier data points accumulated from the different models.

22. An apparatus comprising:
a processor; and
a memory coupled to the processor, the memory comprising computer-executable program code portions stored therein, the computer-executable program code instructions, when executed by the processor, causing the apparatus to:
iteratively test different models and corresponding scales for each of the models, the models being employed for modeling parameters corresponding to a visually detected data;
evaluate each of the models over a plurality of iterations based on a function evaluation of each of the models;
select one of the models based on the function evaluation of the selected one of the models; and
utilize the selected one of the models for fitting the data,
wherein evaluating each of the models comprises assigning a weighting factor to each respective model on the basis of how well each respective model fits the data and assigning a score to the model based on the weighting factor, the weighting factor comprising a weight for each data point indicating how many times the data point has been selected as an inlier for all models.

23. The apparatus of claim 22, wherein the computer-executable program code instructions further cause the apparatus to estimate the scales of inlier data points for each of the models.

* * * * *